(12) United States Patent
Adducci et al.

(10) Patent No.: US 10,987,831 B2
(45) Date of Patent: Apr. 27, 2021

(54) DIES FOR FORMING A PART AND ASSOCIATED SYSTEMS AND METHODS

(71) Applicant: The Boeing Company, Chicago, IL (US)

(72) Inventors: Mitchell D. Adducci, St. Charles, MO (US); Andrew M. Dummerth, St. Louis, MO (US); Ashley A. McKenna, St. Louis, MO (US); William D. Fennewald, Wildwood, MO (US); Chester Hill, IV, Grafton, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/422,790

(22) Filed: May 24, 2019

(65) Prior Publication Data
US 2020/0368942 A1    Nov. 26, 2020

(51) Int. Cl.
    *B29C 33/38*     (2006.01)
    *B29C 33/42*     (2006.01)

(52) U.S. Cl.
    CPC .......... *B29C 33/3828* (2013.01); *B29C 33/42* (2013.01)

(58) Field of Classification Search
    CPC ....... B29C 33/42; B29C 33/38; B29C 33/428; B29C 2033/426; B29C 33/3828; B29C 33/424; B29C 2043/522
    See application file for complete search history.

(56) References Cited

U.S. PATENT DOCUMENTS

| | | | | |
|---|---|---|---|---|
| 3,734,449 A | * | 5/1973 | Itou | B29C 33/3828 249/114.1 |
| 3,889,363 A | * | 6/1975 | Davis | B29C 33/0033 29/848 |
| 4,338,068 A | * | 7/1982 | Suh | B29C 45/7331 249/78 |
| 4,548,773 A | * | 10/1985 | Suh | B29C 45/7331 264/327 |

(Continued)

FOREIGN PATENT DOCUMENTS

| | | |
|---|---|---|
| DE | 3103890 C1 * | 11/1982 |
| DE | 102009045597 B3 * | 1/2011 |

(Continued)

OTHER PUBLICATIONS

Extended European Search Report for European Patent Application No. 20169550.9 dated Oct. 7, 2020.

*Primary Examiner* — Xiao S Zhao
*Assistant Examiner* — Emmanuel S Luk
(74) *Attorney, Agent, or Firm* — Kunzler Bean & Adamson (57) ABSTRACT

Disclosed herein is a die for forming a part. The die comprises a base, comprising a heat-platen interface surface and a part interface surface, and wherein the heat-platen interface surface and the part interface surface are separated by a thickness of the base. The die also comprises inserts, embedded within and circumferentially closed by the base, spaced apart from each other, and extending in a first direction from the heat-platen interface surface toward the part interface surface. The base is made of a first material having a first thermal conductivity. The inserts are made of a second material having a second thermal conductivity. The first thermal conductivity is different than the second thermal conductivity.

20 Claims, 9 Drawing Sheets

(56) References Cited

U.S. PATENT DOCUMENTS

| | | | | |
|---|---|---|---|---|
| 5,020,770 A | * | 6/1991 | Moberg | B29C 33/02 249/111 |
| 5,031,483 A | * | 7/1991 | Weaver | B29C 64/147 76/107.1 |
| 5,260,014 A | * | 11/1993 | Holton | B29C 33/04 264/134 |
| 5,292,463 A | * | 3/1994 | Paul | B29C 48/875 264/40.6 |
| 5,354,195 A | * | 10/1994 | Dublinski | B29C 33/38 425/504 |
| 5,358,211 A | * | 10/1994 | Sterett | B29C 33/56 249/80 |
| 5,603,871 A | * | 2/1997 | Koseko | B29C 43/183 264/1.9 |
| 5,612,066 A | * | 3/1997 | Swenson | B29C 41/38 425/425 |
| 5,885,504 A | * | 3/1999 | David | B29C 35/0288 264/257 |
| 6,019,930 A | * | 2/2000 | Baresich | B29C 45/2642 264/327 |
| 6,091,063 A | * | 7/2000 | Woods | B23K 20/023 219/633 |
| 6,209,847 B1 | * | 4/2001 | Frul | B29C 33/38 249/111 |
| 6,283,745 B1 | * | 9/2001 | Suzuki | B29C 33/3828 249/135 |
| 6,309,587 B1 | * | 10/2001 | Gniatczyk | B29C 33/38 264/510 |
| 6,413,068 B1 | * | 7/2002 | Steidl | B29D 30/0629 425/40 |
| 7,920,937 B2 | * | 4/2011 | Barlier | B29C 33/04 700/119 |
| 8,202,465 B2 | | 6/2012 | Yen et al. | |
| 9,032,774 B1 | | 5/2015 | Hanks et al. | |
| 9,415,536 B2 | * | 8/2016 | Fideu | B29C 33/02 |
| 9,914,275 B1 | * | 3/2018 | Smith | B30B 11/04 |
| 10,518,446 B1 | * | 12/2019 | Jenkins | B29C 45/7331 |
| 2003/0222376 A1 | * | 12/2003 | Imatomi | B29C 45/2642 264/219 |
| 2004/0041303 A1 | * | 3/2004 | Kim | B29C 33/02 264/320 |
| 2004/0253341 A1 | * | 12/2004 | Liew | B29C 33/38 425/470 |
| 2005/0196485 A1 | * | 9/2005 | Cass | B29C 33/3828 425/526 |
| 2006/0249872 A1 | * | 11/2006 | Manuel | B29C 33/3842 264/225 |
| 2006/0290025 A1 | * | 12/2006 | Chae | B29C 33/38 264/219 |
| 2008/0003323 A1 | | 1/2008 | Manuel et al. | |
| 2008/0011417 A1 | * | 1/2008 | Manuel | B29C 33/38 156/308.2 |
| 2009/0057955 A1 | * | 3/2009 | Hirata | B29C 45/263 264/299 |
| 2009/0291161 A1 | * | 11/2009 | Kayano | B29C 45/73 425/552 |
| 2012/0267828 A1 | * | 10/2012 | Halford | B29C 35/0288 264/327 |
| 2012/0280415 A1 | * | 11/2012 | Halford | B29C 33/02 264/40.1 |
| 2013/0040012 A1 | * | 2/2013 | Sugie | F16D 69/00 425/404 |
| 2013/0248584 A1 | * | 9/2013 | Bi | B23K 31/02 228/176 |
| 2013/0328243 A1 | * | 12/2013 | Hino | B29C 33/3828 264/322 |
| 2015/0102202 A1 | * | 4/2015 | Torii | B29C 33/3828 249/116 |
| 2015/0104536 A1 | * | 4/2015 | Hertle | B29C 70/44 425/388 |
| 2015/0165665 A1 | * | 6/2015 | Guichard | H05B 6/42 425/552 |
| 2015/0266220 A1 | * | 9/2015 | Fideu | B29C 33/02 264/328.16 |
| 2015/0321403 A1 | * | 11/2015 | Kameyama | B29C 45/26 264/41 |
| 2016/0031121 A1 | * | 2/2016 | Sugiura | B29C 33/02 249/111 |
| 2016/0375661 A1 | | 12/2016 | Dalal et al. | |
| 2017/0100865 A1 | * | 4/2017 | Goodwin | B29C 33/565 |
| 2018/0214948 A1 | * | 8/2018 | Morimoto | B29C 64/295 |
| 2018/0222107 A1 | * | 8/2018 | Hall | B29C 33/302 |
| 2018/0370078 A1 | * | 12/2018 | Haibach | B29C 33/3842 |
| 2019/0291322 A1 | * | 9/2019 | Hahnlen | B29C 45/40 |

FOREIGN PATENT DOCUMENTS

| | | | |
|---|---|---|---|
| JP | H0591820 U | * | 12/1993 |
| JP | 2005138366 A | * | 6/2005 |
| WO | WO2005/120803 A1 | * | 12/2005 |
| WO | WO2007/038385 A2 | * | 4/2007 |

* cited by examiner

DIES FOR FORMING A PART AND ASSOCIATED SYSTEMS AND METHODS

FIELD

This disclosure relates generally to forming materials into desired shapes, and more particularly to using a heated die to form a material into a part having a desired shape.

BACKGROUND

Dies are heated and compressed against a material to form the material into a part with a desired shape. Due to thickness variations in the dies, uniform heating of the dies is difficult. Non-uniform heating of a die can lead to incomplete formation of the material into the desired shape or create excessive residual stresses in the formed part.

SUMMARY

The subject matter of the present application provides examples of dies, systems, and methods for forming parts that overcome the above-discussed shortcomings of prior art techniques. The subject matter of the present application has been developed in response to the present state of the art, and in particular, in response to shortcomings of conventional dies, and the conventional methods and systems for forming parts from the dies.

Disclosed herein is a die for forming a part. The die comprises a base, comprising a heat-platen interface surface and a part interface surface. The heat-platen interface surface and the part interface surface are separated by a thickness of the base. The die also comprises inserts, embedded within and circumferentially closed by the base, spaced apart from each other, and extending in a first direction from the heat-platen interface surface toward the part interface surface. The base is made of a first material having a first thermal conductivity. The inserts are made of a second material having a second thermal conductivity. The first thermal conductivity is different than the second thermal conductivity. The preceding subject matter of this paragraph characterizes example 1 of the present disclosure.

Each of the inserts has a length, parallel to the thickness of the base. The length of a first one of the inserts is different than the length of a second one of the inserts. The preceding subject matter of this paragraph characterizes example 2 of the present disclosure, wherein example 2 also includes the subject matter according to example 1, above.

The thickness of the base varies along the part interface surface such that the base comprises a first portion having a first thickness and a second portion having a second thickness. The first thickness is greater than the second thickness. The first one of the inserts is embedded in the first portion of the base and has a first length. The second one of the inserts is embedded in the second portion of the base and has a second length that is less than the first length. The preceding subject matter of this paragraph characterizes example 3 of the present disclosure, wherein example 3 also includes the subject matter according to example 2, above.

The inserts extend from the heat-platen interface surface to the part interface surface such that the inserts span an entirety of the thickness of the base. The preceding subject matter of this paragraph characterizes example 4 of the present disclosure, wherein example 4 also includes the subject matter according to any one of examples 1-3, above.

The inserts extend from the heat-platen interface surface to a location intermediate the heat-platen surface and the part interface surface such that the inserts span only a portion of the thickness of the base. The preceding subject matter of this paragraph characterizes example 5 of the present disclosure, wherein example 5 also includes the subject matter according to any one of examples 1-3, above.

The first thermal conductivity is less than the second thermal conductivity. The thickness of the base varies along the part interface surface such that the base comprises a first portion having a first thickness and a second portion having a second thickness. The first thickness is greater than the second thickness. First ones of the inserts are embedded in the first portion of the base. Second ones of the inserts are embedded in the second portion of the base. A quantity, per surface area of the heat-platen interface surface, of the first ones of the inserts is greater than a quantity, per surface area of the heat-platen interface surface, of the second ones of the inserts. The preceding subject matter of this paragraph characterizes example 6 of the present disclosure, wherein example 6 also includes the subject matter according to any one of examples 1-5, above.

The first thermal conductivity is less than the second thermal conductivity. A quantity, per surface area of the heat-platen interface surface, of the inserts in any given portion of the base is a multiple of the thickness of the given portion of the base. The preceding subject matter of this paragraph characterizes example 7 of the present disclosure, wherein example 7 also includes the subject matter according to any one of examples 1-6, above.

The first thermal conductivity is less than the second thermal conductivity. A quantity, per surface area of the heat-platen interface surface, of the inserts is a multiple of a ratio of the first thermal conductivity and the second thermal conductivity. The preceding subject matter of this paragraph characterizes example 8 of the present disclosure, wherein example 8 also includes the subject matter according to any one of examples 1-7, above.

At least one of the inserts has a first width. At least another of the inserts has a second width. The first width is greater than the second width. The preceding subject matter of this paragraph characterizes example 9 of the present disclosure, wherein example 9 also includes the subject matter according to any one of examples 1-8, above.

The die further comprises inserts made of a third material having a third thermal conductivity. The third thermal conductivity is different than the first thermal conductivity and second thermal conductivity. The preceding subject matter of this paragraph characterizes example 10 of the present disclosure, wherein example 10 also includes the subject matter according to any one of examples 1-9, above.

The thickness of the base varies along the part interface surface such that the base comprises a first portion having a first thickness and a second portion having a second thickness. The first thickness is greater than the second thickness. The second thermal conductivity is greater than the third thermal conductivity. The inserts made of the second material having the second thermal conductivity are embedded in the first portion of the base. The inserts made of the third material having the third thermal conductivity are embedded in the second portion of the base. The preceding subject matter of this paragraph characterizes example 11 of the present disclosure, wherein example 11 also includes the subject matter according to example 12, above.

The first thermal conductivity is less than the second thermal conductivity. The third thermal conductivity is less than the first thermal conductivity. The preceding subject matter of this paragraph characterizes example 12 of the present disclosure, wherein example 12 also includes the subject matter according to example 11, above.

The base has a one-piece, monolithic, construction. The preceding subject matter of this paragraph characterizes example 13 of the present disclosure, wherein example 13 also includes the subject matter according to any one of examples 1-12, above.

The base comprises a plurality of plates, attached together in a stacked formation. The plurality of plates are stacked in a second direction perpendicular to the first direction. Each one of at least some of the plates comprises a plurality of the inserts spaced apart along the plate. The preceding subject matter of this paragraph characterizes example 14 of the present disclosure, wherein example 14 also includes the subject matter according to any one of examples 1-13, above.

The plurality of plates are welded together via a plurality of weldments each attaching together adjacent ones of the plurality of plates. The preceding subject matter of this paragraph characterizes example 15 of the present disclosure, wherein example 15 also includes the subject matter according to example 14, above.

Each one of the inserts has a length parallel to the first direction. Each one of the inserts has width perpendicular to the length. The length of each one of the inserts is at least five times the width of the insert. The preceding subject matter of this paragraph characterizes example 16 of the present disclosure, wherein example 16 also includes the subject matter according to any one of examples 1-15, above.

The base comprises holes. Each one of the inserts is fixed within a corresponding one of the holes. The preceding subject matter of this paragraph characterizes example 17 of the present disclosure, wherein example 17 also includes the subject matter according to any one of examples 1-16, above.

A ratio of the first thermal conductivity and the second thermal conductivity is a multiple of the thickness of the base. The preceding subject matter of this paragraph characterizes example 18 of the present disclosure, wherein example 18 also includes the subject matter according to any one of examples 1-17, above.

Also disclosed herein is a system for forming a part. The system comprises a die. The die comprises a base, comprising a heat-platen interface surface and a part interface surface. The heat-platen interface surface and the part interface surface are separated by a thickness of the base. The die also comprises inserts, embedded within and circumferentially closed by the base, spaced apart from each other, and extending in a first direction from the heat-platen interface surface toward the part interface surface. The base is made of a first material having a first thermal conductivity. The inserts are made of a second material having a second thermal conductivity. The first thermal conductivity is different than the second thermal conductivity. The system also comprises a support surface, configured to support a material to be formed into the part by the die. The die is movable toward and away from the support surface. The system further comprises a heat platen, thermally coupled with the heat-platen interface surface of the base and configured to supply heat to the base and the inserts. The preceding subject matter of this paragraph characterizes example 19 of the present disclosure.

Further disclosed herein is a method of making a die for forming a part. The method comprises forming holes in a base that are spaced apart from each other and extend from a heat-platen interface surface of the base toward a part interface surface of the base. The heat-platen interface surface and the part interface surface are separated by a thickness of the base. The method also comprises filling each of the holes in the base with a corresponding one of a plurality of inserts. The base is made of a first material having a first thermal conductivity and the plurality of inserts are made of a second material having a second thermal conductivity that is different than the first thermal conductivity. The preceding subject matter of this paragraph characterizes example 20 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
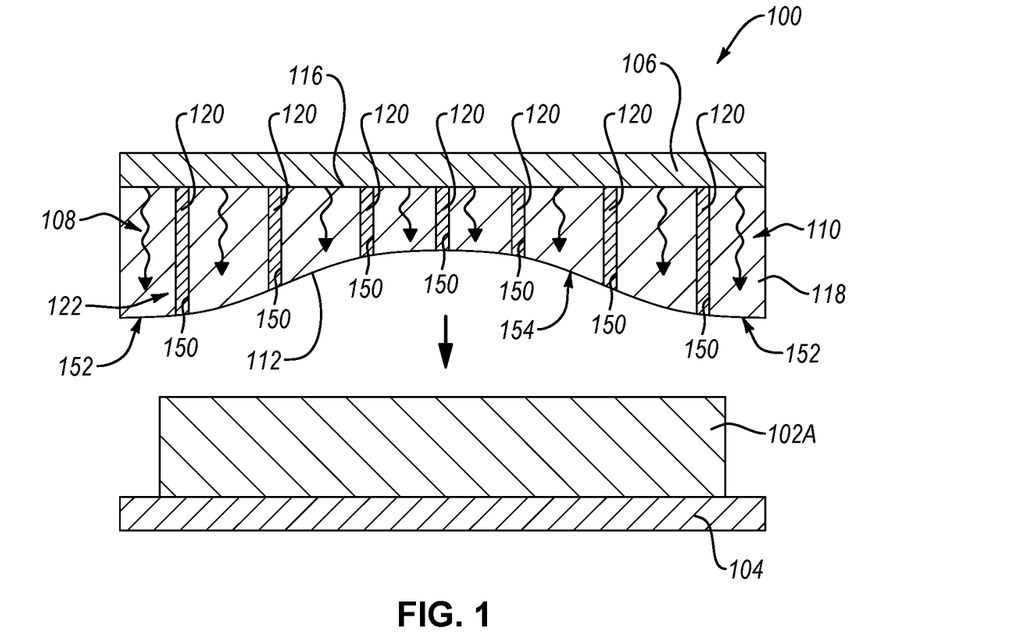
FIG. 1 is a schematic cross-sectional side view of a system for forming a part, prior to forming the part, according to one or more examples of the present disclosure.
Figure 2:
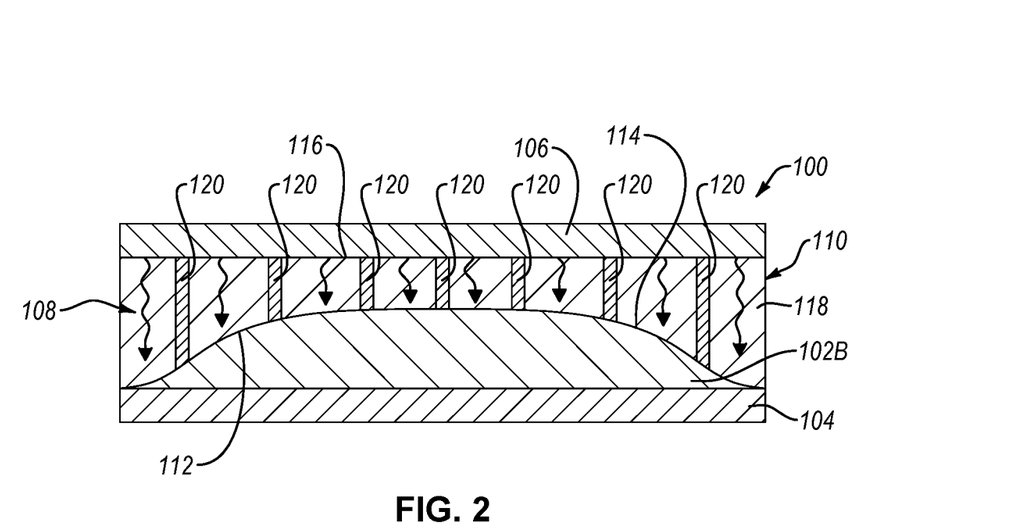
FIG. 2 is a schematic cross-sectional side view of the system of FIG. 1, in the process of forming a part, according to one or more examples of the present disclosure.

Referring to FIGS. 1 and 2, and according to some examples, a system 100 for forming a part 102B includes a die 110, a support surface 104, and a heat platen 106. The support surface 104 is configured to support a material 102A that is to be formed into the part 102B by the die 110. The support surface 104 provides a rigid surface on which the material 102A is supported while the die 110 shapes the material 102A into the part 102B. Accordingly, the support surface 104 is flat in some examples, but can be contoured to complement a contour of the material 102A in other examples. In some examples, the support surface 104 is or includes a die, similar to the die 110, that complements the die 110 in forming the part 102B.

The heat platen 106 is thermally coupled with the die 110. For example, the heat platen 106 is configured to generate heat 108 and supply the heat 108 to the die 110, as indicated by arrows, via a thermal coupling between the heat platen 106 and the die 110. The thermal coupling is facilitated by direct mechanical contact between the heat platen 106 and the die 110 in certain examples. In other example, heat transfer promoting elements, such as thermal grease, are placed between the heat platen 106 and the die 110 to promote heat transfer between the heat platen 106 and the die 110. The heat platen 106, in one example, is a flat plate with a flat die-interface surface that helps to uniformly transfer the heat 108 to the die 110. The heat platen 106 generates heat with integral heat generating elements, such as resistance heaters, magnetic induction heaters, and the like, in certain examples. In other examples, the heat platen 106 generates heat by receiving heat form a heat source, external to the heat platen 106. Such an external heat source can be any of various heat sources known in the art.

The heat 108, received from the heat platen 106, heats the die 110 to a temperature corresponding with a desired forming temperature of the material 102A, which is dependent on the material properties of the material 102A and desired shape of the part 102B. Accordingly, the heat generated by the heat platen 106 and supplied to the die 110 is regulated to heat the die 110 to the desirable forming temperature. The die 110, heated by the heat platen 106, is moved relative to the support surface 104 and the material 102A on the support surface 104 (see, e.g., FIG. 1), and pressed against the material 102A (see, e.g., FIG. 2). In some examples, the support surface 104 is held stationary and the die 110 and the heat platen 106 are moved toward the support surface 104, such as via actuation of an actuator. According to other examples, the support surface 104 is alternatively or additionally movable, such as via actuation of an actuator, toward the die 110. While pressed against the material 102A, heat from the die 110 is transferred to the material 102A to heat the material 102A to the desired forming temperature of the material 102A. As explained below, the die 110 is shaped into a desirable shape of the part 102B. With the material 102A heated to the desired forming temperature and the die 110 pressed against the material 102A, with a desired pressure, the die 110 shapes the material 102A into the desirable shape to form the part 102B. As mentioned above, in some examples, the support surface 104 includes an opposing die that is heated like the die 110 and shapes the material 102A into a desirable shape concurrently with the die 110.

Due to the shape of dies, such as a variable thickness of dies, heat received from a heat platen, although uniformly distributed upon receipt, does not uniformly diffuse through the dies 110. Accordingly, a die can have a thermal gradient through a thickness of the die. Non-uniform diffusion of heat or thermal gradients through a die can result in a non-uniform transfer of heat to the material 102A and a thermal gradient across the material 102A. Thermal gradients in the material 102A can cause incomplete forming of the part 102B and/or the formation of excessive residual stresses in the part 102B. Additionally, thermal gradients in the die can negatively impact the overall life of the die.

The die 110 of the system 100 is configured to help reduce thermal gradients in the die 110 and the material 102A being formed, which helps promote complete formation of and lower residual stresses in the part 102B, as well as the longevity of the die 110.

Referring to FIG. 1, the die 110 includes a base 118 and inserts 120 embedded within the base 118. The base 118 is a block-like element made of a thermally conductive material, such as metal. The material of the base 118 has a first thermal conductivity. The base 118 includes a heat-platen interface surface 116 and a part interface surface 112. The heat-platen interface surface 116 and the part interface surface 112 are on opposite sides of the base 118. In other words, the heat-platen interface surface 116 and the part interface surface 112 are separated by a thickness T of the base 118. The heat-platen interface surface 116 complements the heat platen 106. Accordingly, in some examples, the heat-platen interface surface 116 is flat and the thickness T of the base 118 is perpendicular to the heat-platen interface surface 116. However, in other examples, the heat-platen interface surface 116 is non-flat or contoured.

Figure 4:
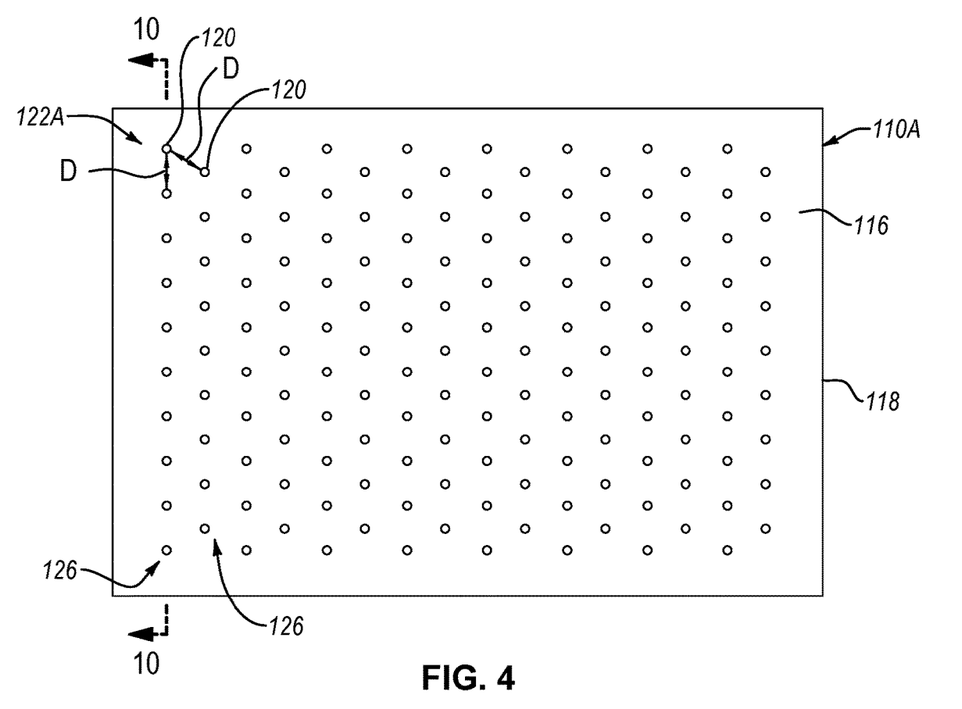
FIG. 4 is a schematic top view of a die for forming a part, according to one or more examples of the present disclosure.
Figure 5:
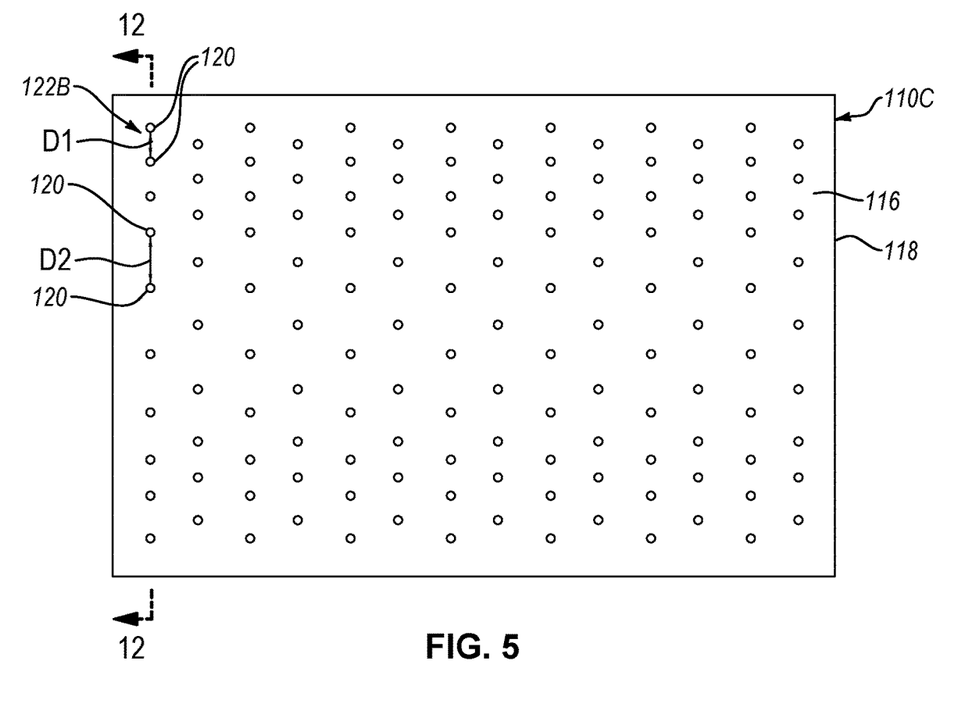
FIG. 5 is a schematic top view of a die for forming a part, according to one or more other examples of the present disclosure.
Figure 7:
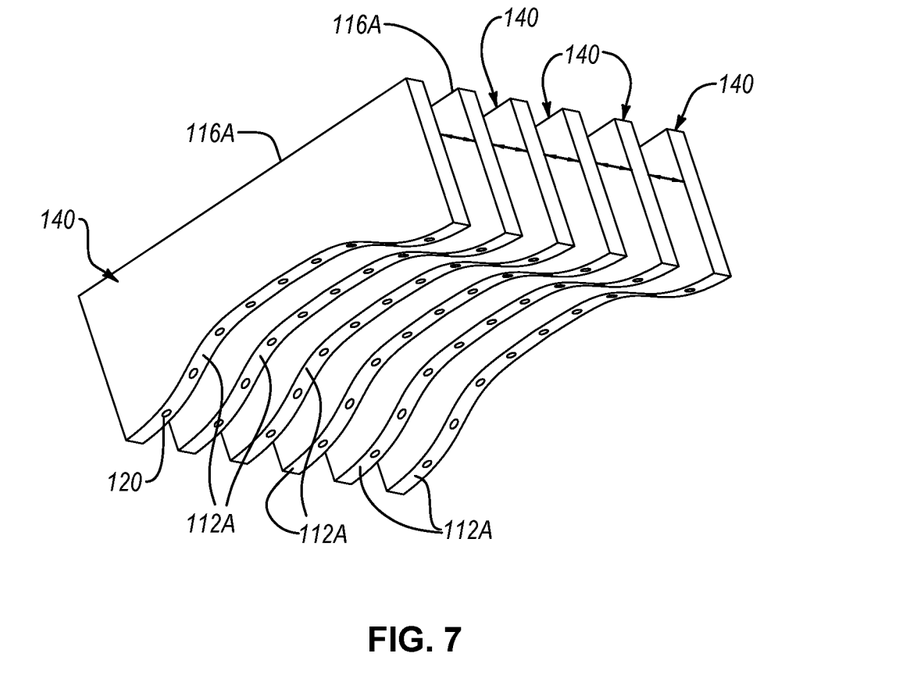
FIG. 7 is a schematic exploded perspective view of a die for forming a part, according to one or more examples of the present disclosure.
Figure 8:
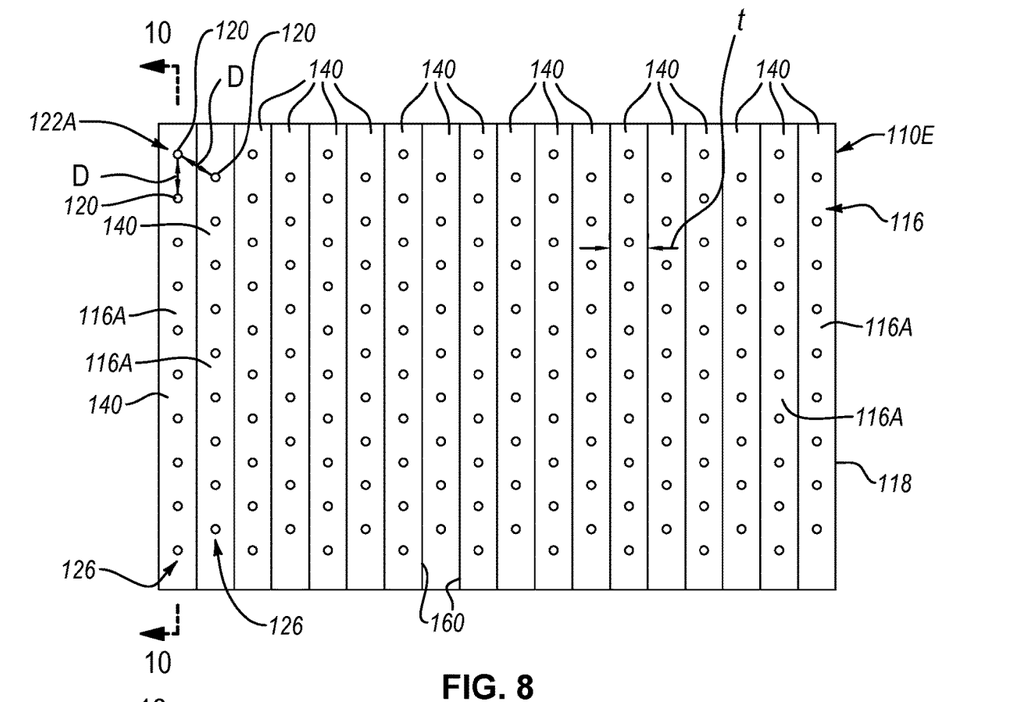
FIG. 8 is a schematic top view of a die for forming a part, according to one or more examples of the present disclosure.
Figure 9:
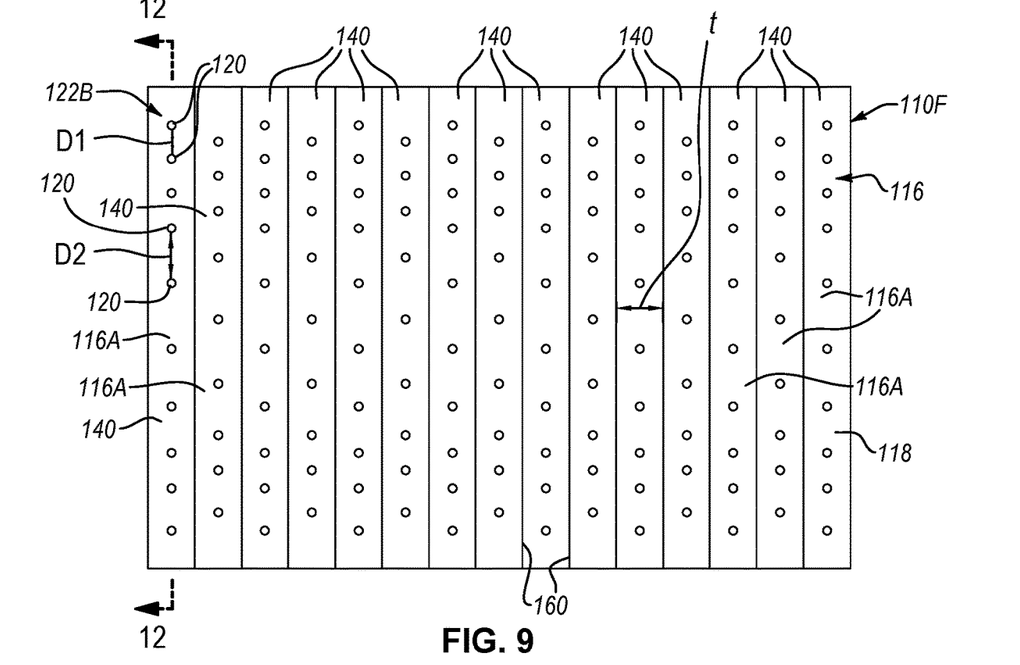
FIG. 9 is a schematic top view of a die for forming a part, according to one or more additional examples of the present disclosure.

The base 118 has a one-piece, monolithic, construction in some examples, as shown in FIGS. 4 and 5. However, in other examples, such as shown in FIGS. 7-9, the base 118 includes a plurality of plates 140 that are attached together in a stacked formation. The plurality of plates 140 are stacked in a direction that is parallel to the heat-platen interface surface 116 or perpendicular to the direction the die 110 moves relative to the support surface 104. The plates 140 are welded together via a plurality of weldments 160 each attaching together adjacent ones of the plurality of plates 140. Each of the plates 140 has a thickness that is significantly smaller than a width or length of the plate 140 such that the thicknesses of the plates 140 combine to define a length of the base 118.

The part interface surface 112 complements the desired shape of the part 102B. In examples where the desired shape of the part 102B is contoured, the part interface 112 is correspondingly contoured. The shape of the part interface surface 112 is inverted relative to the shape of the part 102B. In other words, concavities in the part interface surface 112 produce convexities in the part 102B and convexities in the part interface surface 112 produce concavities in the part 102B. Because the part interface surface 112 is in direct contact with the material 102A, heat is transferred directly from the part interface surface 112 to the material 102A. Accordingly, the thermal distribution at the part interface surface 112 translates into the thermal distribution in the material 102A. In some examples, the thermal distribution at the part interface surface 112 is desirably uniform such that the thermal distribution in the material 102A also is uniform, such as when uniform deformability of the part 102B across the entirety of the part is desired. However, in other examples, the thermal distribution at the part interface surface 112 is desirably non-uniform resulting in a non-uniform thermal distribution in the material 102A, such as when non-uniform deformability of the part 102B across the entirety of the part 102B is desired.

Whether uniform or non-uniform thermal distribution at the part interface surface 112 is desired, undesired thermal gradients along the thickness T of the die 110 may interfere with the desired thermal distribution at the part interface surface 112. The die 110 is particularly susceptible to thermal gradients where the part interface surface 112 is contoured and the thickness T of the die 110 varies across a width or length of the die 110 (e.g., perpendicular to the thickness T). For example, without the inserts 120, where the thickness of the die 110 varies, temperatures of the part interface surface 112 at a first, thicker, portion 152 of the die 110 can be less than at a second, thinner, portion 154 of the die 110, notwithstanding a uniform temperature distribution at the heat-platen interface surface 116. This is because the thermal conductivity of the material of the base 118 may not be high enough to facilitate uniform heat transfer through the entire thickness T of the base 118 at the first portion 152 and the second portion 154.

The inserts 120 of the die 110 help to increase, decrease, or improve the heat transfer through the thickness T of the base 118. For example, the inserts 120 help to improve uniformity of the temperature distribution across the part interface surface 112 of the die 110, particularly when the base 118 of the die 110 has a variable thickness. The inserts 120 are spaced apart from each other and are circumferentially closed by the base 118. In some examples, the inserts 120 are in direct thermal contact with the base 118 to efficiently transfer heat between the inserts 120 and the base 118.

The inserts 120 extend in a first direction from the heat-platen interface surface 116 toward the part interface surface 112. In some examples, the first direction is perpendicular to the heat-platen interface surface 116 and/or parallel to the thickness T of the base 118, which promotes an efficient transfer of heat to the part interface surface 112. Each one of the inserts 120 has a length L parallel to the first direction. In other words, the inserts 120 are elongated in the first direction, such that, in some examples, each insert can be defined as a shaft or a rod. Moreover, each one of the inserts 120 has a width W that is perpendicular to the length L. In some examples, the length L of each one of the inserts 120 is at least five times the width W of the insert 120. According to certain examples, the length L of each one of the inserts 120 is at least ten times the width W of the insert 120.

The inserts 120 can have any of various cross-sectional shapes. To promote a more uniform thermal distribution of heat in the die 110, in one example, the inserts 120 have a circular cross-sectional shape, such that the width W of an insert 120 is the diameter of the insert 120. However, in other examples, the inserts 120 have a non-circular cross-sectional shape, such as square, triangular. As shown in, for example, FIG. 4, all the inserts 120 of the die 110 have the same cross-sectional shape. But, in other examples, some of the inserts 120 of the die 110 have different cross-sectional shapes than others of the inserts 120 to provide local customization of the heat transfer profile of the die 110.

Figure 3A:
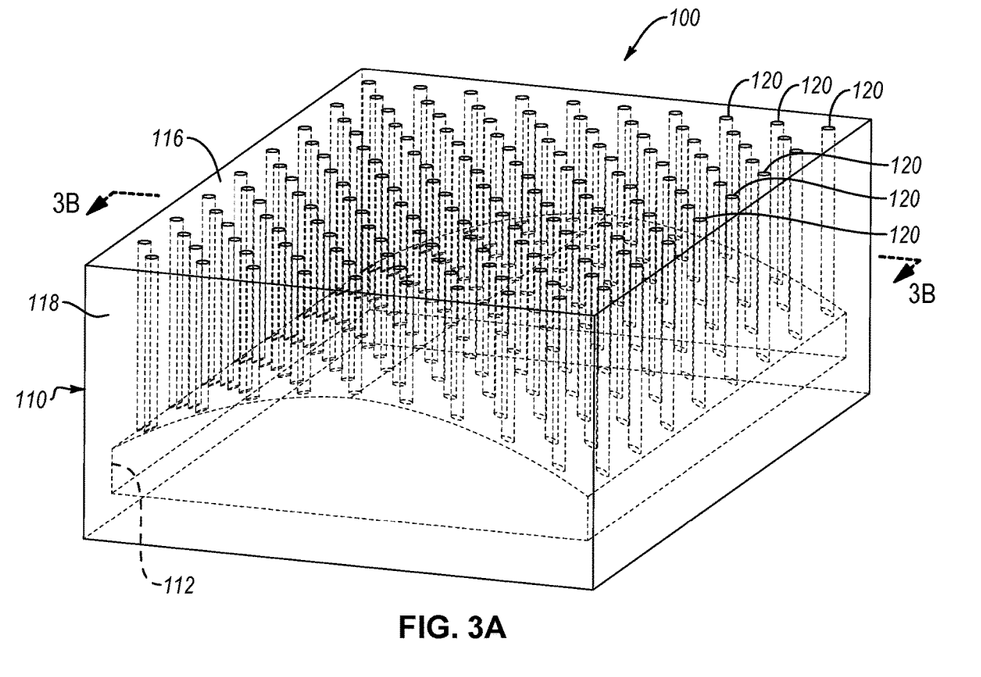
FIG. 3A is a schematic perspective view of a die for forming a part, according to one or more examples of the present disclosure.
Figure 3B:
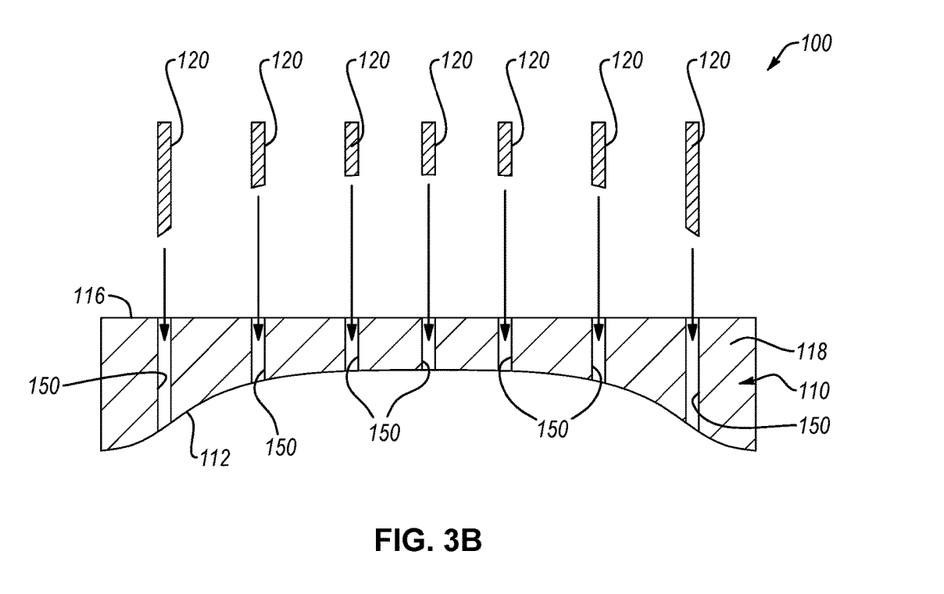
FIG. 3B is a schematic cross-sectional exploded side view of the die of FIG. 3A, taken along the line 3B-3B of FIG. 3A, according to one or more examples of the present disclosure.
Figure 15:
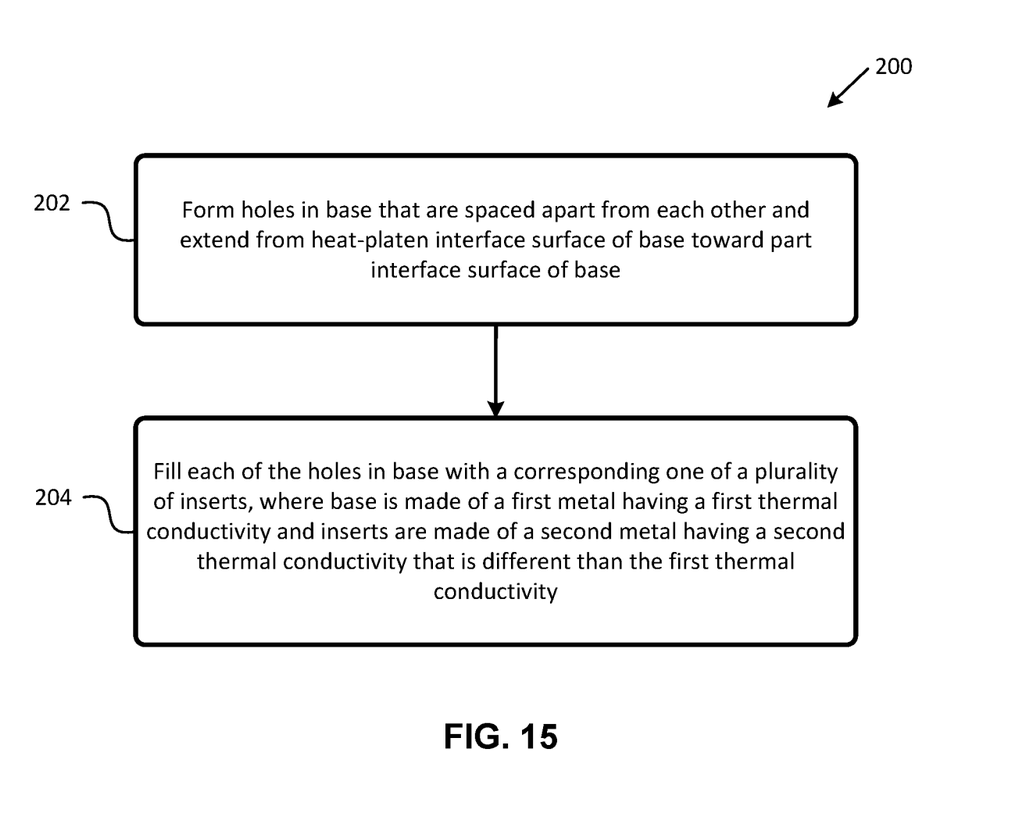
FIG. 15 is a schematic flow diagram of a method of making a die, for forming a part, according to one or more examples of the present disclosure.

According to some examples, the inserts 120 are co-formed with the base 118 or the base 118 is formed around the inserts 120. However, in other examples, as shown in FIGS. 3A and 3B, the base 118 includes holes 150 and each one of the inserts 120 is fixed within a corresponding one of the holes 150. The holes 150 are spaced apart from each other. The holes 150 are formed concurrently with the rest of the base 118, such as with the part interface surface 112 of the base 118, in some examples. In other examples, the holes 150 are drilled into the base 118, after the base 118 is formed. In either of the examples, with reference to FIG. 15 and according to one example of a method 200, the die 110 is made by (block 202) forming the holes 150 in the base 118 and (block 204) filling each of the holes 150 with a corresponding one of the inserts 120. The inserts 120 are adhered to the holes 150 in the base 118 with an adhesive in certain examples. In yet other examples, the inserts 120 are welded in the holes 150. The holes 150 can be through-holes (see, e.g., FIG. 10) or blind holes (see, e.g., FIG. 11).

The inserts 120 are made of a thermally conductive material, such as a metal or a non-metal (e.g., graphite, ceramic materials, etc.). The thermal conductivity of the material of the inserts 120 is different than the first thermal conductivity of the material of the base 118. The difference in thermal conductivities of the base 118 and the inserts 120 promotes heat transfer behavior in the inserts 120 that is different than in the base 118. In this manner, the heat transfer performance of the die 110 is enhanced or controlled by the inserts 120. In some examples, the materials of the base 118 and the inserts 120 are selected such that a ratio of the first thermal conductivity and the second thermal conductivity is a multiple of the thickness T of the base 118. In particular, according to one example, the second thermal conductivity is higher than the first thermal conductivity, and the thicker the base 118 the lower the ratio of the first thermal conductivity and the second thermal conductivity.

According to some examples, the inserts 120 are made of a material that has a thermal conductivity that is greater than the thermal conductivity of the material of the base 118. Such a configuration allows heat to be more efficiently transferred to the part interface surface 112. In one example, the base 118 is made of steel, such as stainless steel, and the inserts 120 are made of graphite, or another material, such as cast iron, copper, gold, aluminum, etc. In some examples, all of the inserts 120 of the die 110 are made of a material with a thermal conductivity higher than that of the base 118. However, according to certain examples, only some of the inserts 120 have a higher thermal conductivity than the base 118, with others of the inserts 120 having a lower thermal conductivity than the base 118. It is recognized that those inserts 120 having a lower thermal conductivity than the base 118 can be a solid material, with a lower thermal conductivity, or the inserts 120 can be defined as an empty hole filled with air (or other gas), which has a lower thermal conductivity than the base 118.

The inserts 120 are made of a material with a melting temperature equal to or higher than that the forming temperature of the material 102A. More specifically, the inserts 120 are made of a material that does not melt while the material 102A is heated and compressed to form the part 102B.

Several particular examples of the die 110 will now be described with reference to FIGS. 4-14. The dies of FIGS. 4-14 are analogous to the die 110 of FIGS. 1 and 2, with like numbers referring to like features. Accordingly, the same general description of the die 110, as presented above, is applicable to the dies of FIGS. 4-14, unless otherwise noted.

Referring to FIG. 4, according to one example, a die 110A has a first pattern 122A of inserts 120 arranged in the base 118. According to the first pattern 122A, each insert 120 is spaced the same distance D away from an adjacent insert 120. In other words, the first pattern 122A is uniform or a spatial density of the inserts 120 (e.g., a quantity, per surface area of the heat-platen interface surface 116, of the inserts) is constant across the heat-platen interface surface 116. Accordingly, for the first pattern 122A, heat transfer from the heat platen 106 through the inserts 120 is uniform. In an exemplary example of a die, as shown in FIG. 4, that is made of stainless steel, each insert may be an iron rod of 0.25 inch diameter (0.05 square inches) with a spacing of about 1 inch between centers of each adjacent insert, for example, and the pattern may span 8.250 inches by 8.916 inches while the combined cross-sectional area of the 94 inserts would be about 6.5 percent (or ⅟15) of the pattern area, for example, where such a percentage of the pattern area/interface surface may be determined based on a ratio of thermal conductivity of stainless steel to iron (where stainless steel possesses ⅕ the conductivity of iron). Accordingly, for a given die interface area, the selection of a combined cross-sectional area of the inserts, or the number of inserts 120, may be based on the ratio of the first thermal conductivity of the die base metal and the second thermal conductivity of the insert metal. In the above exemplary example, the number of inserts may be that which provides a total insert cross-sectional area that is at least 6.5 percent (or ⅟15) of the interface surface based on the ratio (1 to 5) of the first thermal conductivity of the die base metal and the second thermal conductivity of the insert metal. Additionally, the width W of each insert 120 of the first pattern 122A is the same in some examples.

Figure 10:
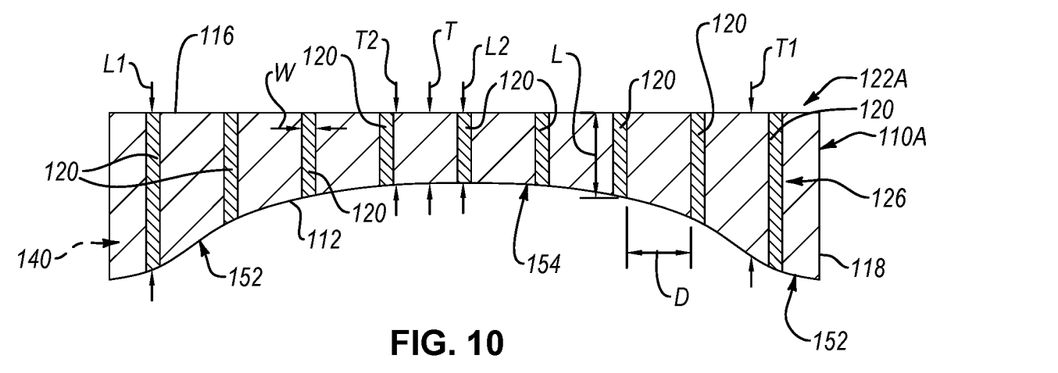
FIG. 10 is a schematic cross-sectional side view of the die of FIGS. 4 and 8, taken along the line 10-10 of FIGS. 4 and 8, according to one or more examples of the present disclosure.

Although the spatial density of the inserts 120 of the first pattern 122A is the same across the heat-platen interface surface 116, the lengths L of the inserts 120 of the first pattern 122A can vary. Referring to FIG. 10, the inserts 120 of the first pattern 122A extend from the heat-platen interface surface 116 of the base 118 to the part interface surface 112 of the base 118, such that the inserts 120 span an entirety of the thickness T of the base 118. In some examples, inserts 120 extending to the part interface surface 112 promote localized hot spots, which can be utilized to form parts 102B with complex shapes.

Because the thickness T of the base 118 in the illustrated example has a variable thickness along the part interface surface 112, the lengths L of the inserts 120 also vary along the part interface surface 112. For example, in FIG. 10, the base 118 includes a first portion 152 that has a first thickness T1 and the base 118 includes a second portion 154 that has a second thickness T2. The first thickness T1 is greater than the second thickness T2. In the illustrated example, the base 118 includes one second portion 154 between two first portions 152. Because the first thickness T1 is greater than the second thickness T2, and the inserts 120 span an entirety of the thickness T of the base 118, the inserts 120 embedded in the first portion 152 have a length L1 that is greater than a length L2 of the inserts 120 embedded in the second portion 154. The longer length L1 of the inserts 120 in the first portion 152 helps to transfer heat to the part interface surface 112 at the first portion 152 such that the temperature at the part interface surface 112 of the first portion 152 is the same or similar to the temperature at the part interface surface 112 of the second portion 154.

Figure 11:
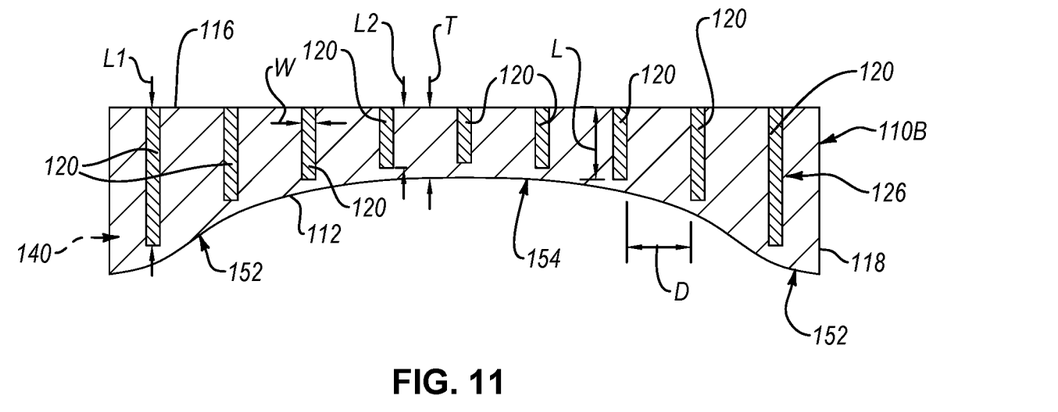
FIG. 11 is a schematic cross-sectional side view of the die of FIGS. 4 and 8, taken along the line 10-10 of FIGS. 4 and 8, according to one or more additional examples of the present disclosure.

Referring to FIG. 11, according to the die 110B, the inserts 120 of the first pattern 122A extend from the heat-platen interface surface 116 of the base 118 to the part interface surface 112 of the base 118, such that the inserts 120 span only a portion of the thickness T of the base 118. Accordingly, even if the thickness T of the base 118 has a variable thickness along the part interface surface 112, the lengths L of the inserts 120 can, but need not, vary along the part interface surface 112. In the illustrated example of FIG. 11, the inserts 120 embedded in the first portion 152 have a length L1 that is greater than a length L2 of the inserts 120 embedded in the second portion 154, but the inserts 120 do not reach, or are spaced apart from, the part interface surface 112. In some examples, because the inserts 120 do not extend to the part interface surface 112, localized hot spots on the part interface surface 112 are reduced.

Although not shown, in certain examples, the die 110 includes some inserts 120 that span the entirety of the thickness T of the base 118 to reach the part interface surface 112 and other inserts 120 that span only a portion of the thickness T to stop short of the part interface surface 112. Such a configuration facilitates more direct heat transfer to some locations on the part interface surface 112 than others, which, in some examples, helps form hot spots in some locations on the part interface surface 112 and not in others.

Referring to FIG. 5, according to one example, a die 110C has a second pattern 122B of inserts 120 arranged in the base 118. According to the second pattern 122B, the distance D between adjacent inserts 120 for some of the inserts 120 is different than others of the inserts 120. For example, as shown, at least one set of adjacent inserts 120 are spaced apart by a first distance D1 and at least another set of adjacent inserts 120 are spaced apart by a second distance D2, where the first distance D1 is less than the second distance D2. In other words, the second pattern 122B is non-uniform or the spatial density of the inserts 120 (e.g., a quantity, per surface area of the heat-platen interface surface 116, of the inserts) varies across the heat-platen interface surface 116. Accordingly, for the second pattern 122B, heat transfer from the heat platen 106 through the inserts 120 is non-uniform.

Figure 12:
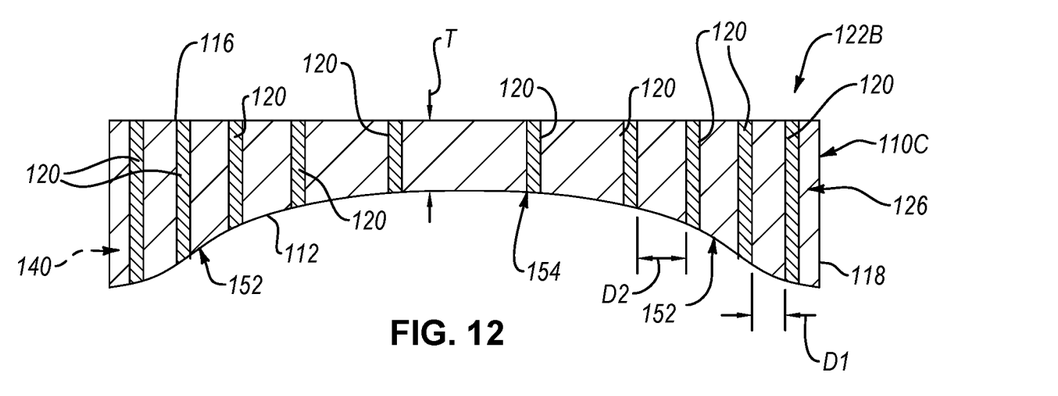
FIG. 12 is a schematic cross-sectional side view of the die of FIGS. 5 and 9, taken along the line 12-12 of FIGS. 5 and 9, according to one or more examples of the present disclosure.

In one example, the spatial density of the inserts 120 is proportional to (e.g., is a multiple of) the thickness T of the of the base 118. In other words, the greater the thickness T of a portion of the base 118, the lower the distance D and the higher the spatial density of the inserts 120 at that portion of the base 118. Therefore, for the second pattern 122B of the example illustrated in FIGS. 5 and 12, a quantity, per surface area of the heat-platen interface surface 116, of the inserts 120 embedded in the first portion 152 of the base 118 is greater than a quantity, per surface area of the heat-platen interface surface 116, of the inserts 120 embedded in the second portion 154 of the base 118. In one example, the quantity, per surface area of the heat-platen interface surface 116, of the inserts 120 is a multiple of both the thickness T of the base 118 and ratio of the thermal conductivities of the base 118 and the inserts 120. In the example of FIGS. 5 and 12, the width W of each insert 120 of the second pattern 122B is the same.

According to some examples, the quantity, per surface area of the heat-platen interface surface 116, of the inserts 120 embedded in the base 118 is proportional to (e.g., a multiple of) a ratio of the thermal conductivity of the material of the base 118 and the thermal conductivity of the material of the inserts 120. In other words, the spatial density of the inserts 120 is dependent on the difference between the thermal conductivities of the materials of the base 118 and the inserts 120. Accordingly, in certain examples, the thermal conductivity of the base 118 is less than the thermal conductivity of the inserts and the higher the thermal conductivity of the inserts 120, the lower the spatial density of the inserts 120, or the lower the thermal conductivity of the inserts 120, the higher the spatial density of the inserts 120.

In some examples, the lengths L of the inserts 120 of the second pattern 122B vary in a manner similar to the inserts 120 of the first pattern 122A of FIG. 10. Referring to FIG. 12, in certain examples, the inserts 120 of the second pattern 122B extend from the heat-platen interface surface 116 of the base 118 to the part interface surface 112 of the base 118, such that the inserts 120 span an entirety of the thickness T of the base 118. Although not shown, in some examples, the inserts 120 of the second pattern 122B extend from the heat-platen interface surface 116 of the base 118 to the part interface surface 112 of the base 118, such that the inserts 120 span only a portion of the thickness T of the base 118, in a manner similar to the inserts 120 of the first pattern 122A of FIG. 11.

Figure 6:
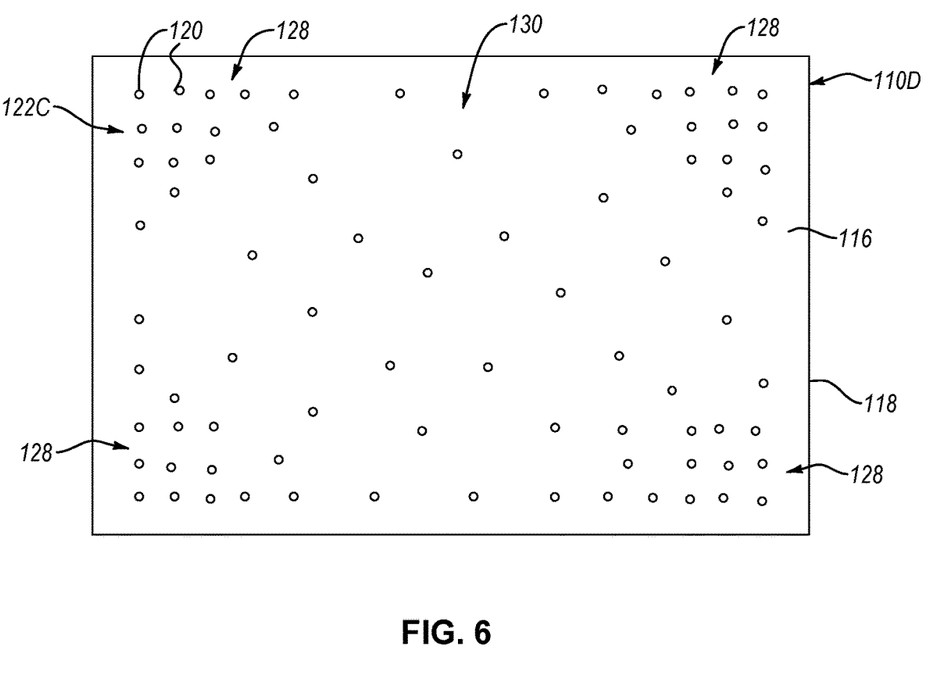
FIG. 6 is a schematic top view of a die for forming a part, according to one or more additional examples of the present disclosure.

Referring to FIG. 6, according to one example, a die 110D has a third pattern 122C of inserts 120 arranged in the base 118. Similar to the second pattern 122B, the distance D between adjacent inserts 120 for some of the inserts 120 of the third pattern 122C is different than others of the inserts 120. In other words, like the second pattern 122B, the third pattern 122C is non-uniform. However, unlike the second pattern 122B, the inserts 120 of the third pattern 122C are not arranged in linear rows or columns of inserts 120. Rather, because the base 118 of the die 110D is a monolithic, one-piece, construction, the inserts 120 need not be linearly aligned along a corresponding plate of multiple plates of the die and the inserts 120 of the third pattern 122C may be aligned along a curved path or not be aligned along any path. The inserts 120 can have any of various widths W greater than about 0.5 inches, which is the width W that the inserts 120 lose their effectiveness at facilitating heat transfer to the part interface surface 112 in some examples.

In contrast to the dies 110A-C, the base 118 of die 110D and die 110E of FIGS. 8 and 9 is made of multiple plates 140. As presented above, the plates 140 are attached together by weldments 160, or other similar bonding techniques. To help maintain the structural integrity of the weldments 160, the inserts 120 are not embedded in the weldments 160, but rather are embedded in the plates 140 between the weldments 160. Accordingly, the inserts 120 have a width W that is less than a thickness t of the corresponding plate 140. Moreover, because the plates 140 are relatively thin plates and to ensure the inserts 120 are wide enough to be effective, in some examples, only one insert 120 can fit within a thickness t of each plate. In one example, each plate 140 is between about 1.0 inch and about 2.0 inches thick and each insert 140 has a width W between about 0.5 inches and about 1.0 inch. According to another example, each plate 140 has a thickness between about 1.0 inch and 3.0 inches and each insert 140 has a width W between about 0.5 inches and 2.0 inches.

Referring to FIG. 8, according to one example, the die 110E includes inserts 120 arranged in the base 118 according to the first pattern 122A. In other words, the inserts 120 of the die 110E have the same pattern as the inserts 120 of the die 110A. To accommodate the first pattern 122A, the inserts 120 are arranged into several rows of inserts 120 with each row of inserts 120 corresponding with one of the plates 140. Accordingly, each one of the plates 140 includes a row of inserts 120 where each insert 120 of the row is spaced apart along a length of the plate 140. Each insert 120 in a row is spaced apart from an adjacent insert 120 in the same row by the same distance D. Moreover, each row of inserts 120 is spaced apart from an adjacent row of inserts 120 such that each insert 120 of a row is spaced apart from a corresponding insert 120 or inserts 120 of an adjacent row by the same distance D. In this manner, each insert 120 of the die 110E is spaced the same distance D away from an adjacent insert 120. In other words, the first pattern 122A is uniform or a spatial density of the inserts 120 of the die 110E is constant across the heat-platen interface surface 116 even though the die 110E is formed of multiple plates 140.

The lengths L of the inserts 120 of the die 110E correspond with lengths L of the inserts 120 of the die 110A, shown in FIG. 10, in some examples. In other examples, the lengths L of the inserts of the die 110E correspond with the lengths L of the inserts 120 of the die 110B, shown in FIG. 11.

Referring to FIG. 9, according to one example, the die 110F includes inserts 120 arranged in the base 118 according to the second pattern 122B. In other words, the inserts 120 of the die 110F have the same pattern as the inserts 120 of the die 110B. To accommodate the second pattern 122B, the inserts 120 are arranged into several rows of inserts 120 with each row of inserts 120 corresponding with one of the plates 140. Accordingly, each one of the plates 140 includes a row of inserts 120 where each insert 120 of the row is spaced apart along a length of the plate 140. Each of at least some of the inserts 120 in a row is spaced apart from an adjacent insert 120 in the same row by a different distance D. For example, as shown, at least one set of adjacent inserts 120 in at least one row are spaced apart by a first distance D1 and at least another set of adjacent inserts 120 in the same row are spaced apart by a second distance D2, where the first distance D1 is less than the second distance D2. Moreover, each row of inserts 120 is spaced apart from an adjacent row of inserts 120 such that each insert 120 of a row is spaced apart from a corresponding insert 120 or inserts 120 of an adjacent row by the same or a different distance D. In this manner, each insert 120 of at least some of the inserts of the die 110F is spaced a different distance D away from an adjacent insert 120. In other words, the second pattern 122B is non-uniform or a spatial density of the inserts 120 of the die 110F varies across the heat-platen interface surface 116 even though the die 110F is formed of multiple plates 140.

The lengths L of the inserts 120 of the die 110F correspond with lengths L of the inserts 120 of the die 110C, shown in FIG. 12, in some examples. In other examples, the lengths L of the inserts of the die 110F correspond with the lengths L of the inserts 120 of the die 110B, shown in FIG. 11.

Although every plate 140 of the die 110E and the die 110F includes inserts 120, in other examples, only some of the plates 140 of the die 110E and the die 110F include inserts. Additionally, in certain examples, the inserts 120 embedded in a given plate 140 of a die need not be in a linear row, but can be non-linearly staggered.

Figure 13:
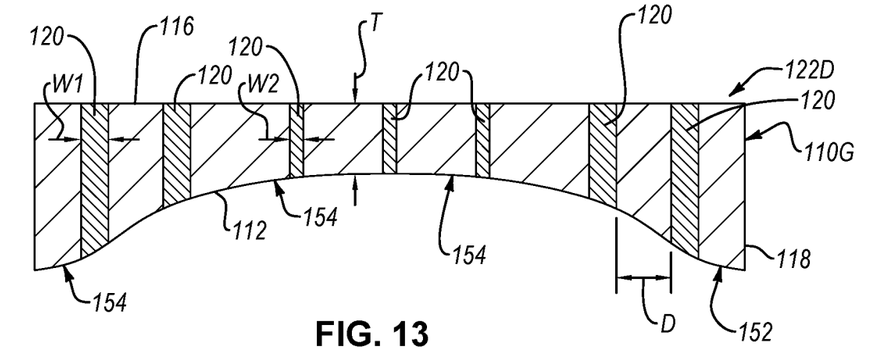
FIG. 13 is a schematic cross-sectional side view of a die for forming a part, taken along a line similar to line 10-10 of FIGS. 4 and 8, according to one or more examples of the present disclosure.

Referring now to FIG. 13, according to another example, a die 110G has a fourth pattern 122D of inserts 120 arranged in the base 118. According to the fourth pattern 122D, the widths W of at least some of the inserts 120 are different. For example, as shown, at least one of the inserts 120 has a first width W1 and at least another of the inserts 120 has a second width W2 that is greater than the first width W1. Assuming the same thermally conductive material, an insert 120 with a larger width is capable of more heat transfer than an insert 120 with a smaller width. For this reason, in some examples, inserts 120 with the larger first width W1 are embedded in the base 118 at locations where more heat transfer may be desired, such as within thicker portions of the base 118 (e.g., the first portions 152), and inserts 120 with the smaller second width W2 are embedded in the base 118 at locations where less heat transfer may be desired, such as within the thinner portions of the base 118 (e.g., the second portion 154). The distance D between adjacent inserts 120 of the fourth pattern 122D can be constant or vary across the heat-platen surface 116, such that the spatial density of the inserts 120 of the fourth pattern 122D can be constant or vary.

Figure 14:
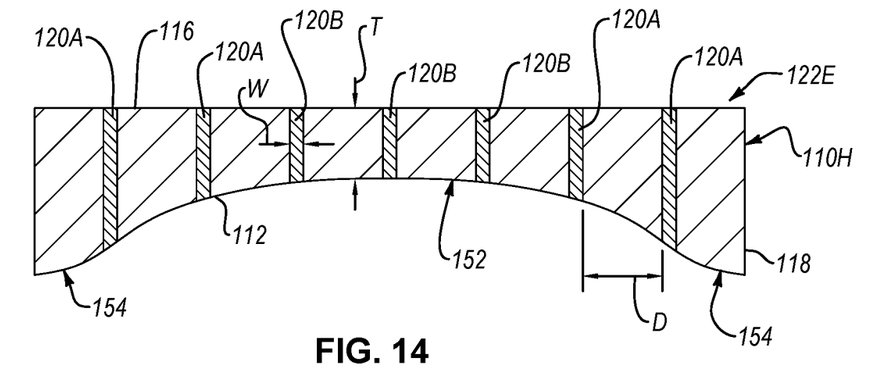
FIG. 14 is a schematic cross-sectional side view of a die for forming a part, taken along a line similar to line 10-10 of FIGS. 4 and 8, according to one or more other examples of the present disclosure.

As shown in FIG. 14, according to another example, a die 110H has a fifth pattern 122E of inserts 120 arranged in the base 118. According to the fifth pattern 122E, some of the inserts 120 are made of a material that is different than the material of others of the inserts 120. For example, some of the inserts 120 (e.g., inserts 120A) are made of the second material, and have the second thermal conductivity, and others of the inserts 120 (e.g., inserts 120B) are made of a third material, and have a third thermal conductivity that is different than the second thermal conductivity. According to some examples, the third thermal conductivity is less than the second thermal conductivity, and the inserts 120A are embedded in the base 118 at locations where more heat transfer may be desired, such as within thicker portions of the base 118 (e.g., the first portions 152), and inserts 120B are embedded in the base 118 at locations where less heat transfer may be desired, such as within the thinner portions of the base 118 (e.g., the second portion 154). The distance D between adjacent inserts 120 of the fifth pattern 122E can be constant or vary across the heat-platen surface 116, such that the spatial density of the inserts 120 of the fifth pattern 122E can be constant or vary.

In some examples of the die 110H, the third thermal conductivity is less than the first thermal conductivity of the base 118. In other words, the heat transfer through the inserts 120B can be less than that through the base 118. Such a configuration may be desirable for dies where the thinner portions of the base 118 (e.g., the second portion 154) are particularly thin, relative to the thicker portions of the base 118 (e.g., the first portions 152) and heat transfer through the thinner portions needs to be reduced or slowed down relative to the base 118 to produce a more uniform temperature distribution at the part interface surface 112.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A die for forming a part, the die comprising:
    a base, comprising a heat-platen interface surface and a part interface surface, and wherein the heat-platen interface surface and the part interface surface are separated by a thickness of the base; and
    inserts, embedded within and circumferentially closed by the base, spaced apart from each other, and extending in a first direction from the heat-platen interface surface toward the part interface surface; and
    wherein:
        the base is made of a first material having a first thermal conductivity;
        the inserts comprise at least one first insert made of a second material having a second thermal conductivity and at least one second insert made of a third material having a third thermal conductivity;
        the first thermal conductivity is different than the second thermal conductivity; and
        the third thermal conductivity is different than the first thermal conductivity and the second thermal conductivity.

2. The die according to claim 1, wherein:
    each of the inserts has a length, parallel to the thickness of the base; and
    the length of a first one of the inserts is different than the length of a second one of the inserts.

3. The die according to claim 2, wherein:
    the thickness of the base varies along the part interface surface such that the base comprises a first portion having a first thickness and a second portion having a second thickness;
    the first thickness is greater than the second thickness;
    the first one of the inserts is embedded in the first portion of the base and has a first length; and
    the second one of the inserts is embedded in the second portion of the base and has a second length that is less than the first length.

4. The die according to claim 1, wherein the inserts extend from the heat-platen interface surface to the part interface surface such that the inserts span an entirety of the thickness of the base.

5. The die according to claim 4, wherein:
    each one of the inserts comprises a first end surface and a second end surface;
    each one of the inserts extends from the first end surface, at the heat-platen interface and in a direction parallel to the thickness of the base, to the second end surface, at the part interface surface;
    the part interface surface is contoured; and
    the second end surface of at least some of the inserts is angled, at an oblique angle, relative to the direction parallel to the thickness of the base, to complement a contoured shape of the part interface surface.

6. The die according to claim 1, wherein the inserts extend from the heat-platen interface surface to a location intermediate the heat-platen surface and the part interface surface such that the inserts span only a portion of the thickness of the base.

7. The die according to claim 1, wherein:
    the first thermal conductivity is less than the second thermal conductivity;
    the thickness of the base varies along the part interface surface such that the base comprises a first portion having a first thickness and a second portion having a second thickness;
    the first thickness is greater than the second thickness;
    first ones of the inserts are embedded in the first portion of the base;
    second ones of the inserts are embedded in the second portion of the base; and
    a quantity, per surface area of the heat-platen interface surface, of the first ones of the inserts is greater than a quantity, per surface area of the heat-platen interface surface, of the second ones of the inserts.

8. The die according to claim 1, wherein:
    the first thermal conductivity is less than the second thermal conductivity; and
    a quantity, per surface area of the heat-platen interface surface, of the inserts in any given portion of the base is a multiple of the thickness of the given portion of the base.

9. The die according to claim 1, wherein:
    the first thermal conductivity is less than the second thermal conductivity; and
    a quantity, per surface area of the heat-platen interface surface, of the inserts is a multiple of a ratio of the first thermal conductivity and the second thermal conductivity.

10. The die according to claim 1, wherein:
    at least one of the inserts has a first width;
    at least another of the inserts has a second width; and
    the first width is greater than the second width.

11. The die according to claim 1, wherein:
the thickness of the base varies along the part interface surface such that the base comprises a first portion having a first thickness and a second portion having a second thickness;
the first thickness is greater than the second thickness;
the second thermal conductivity is greater than the third thermal conductivity;
the at least one first insert made of the second material having the second thermal conductivity is embedded in the first portion of the base; and
the at least one second insert made of the third material having the third thermal conductivity is embedded in the second portion of the base.

12. The die according to claim 11, wherein:
the first thermal conductivity is less than the second thermal conductivity; and
the third thermal conductivity is less than the first thermal conductivity.

13. The die according to claim 1, wherein the base has a one-piece, monolithic, construction.

14. The die according to claim 1, wherein:
the base comprises a plurality of plates, attached together in a stacked formation;
the plurality of plates are stacked in a second direction perpendicular to the first direction; and
each one of at least some of the plates comprises a plurality of the inserts spaced apart along the plate.

15. The die according to claim 14, wherein the plurality of plates are welded together via a plurality of weldments each attaching together adjacent ones of the plurality of plates.

16. The die according to claim 1, wherein:
each one of the inserts has a length parallel to the first direction:
each one of the inserts has width perpendicular to the length; and
the length of each one of the inserts is at least five times the width of the insert.

17. The die according to claim 1, wherein:
the base comprises holes; and
each one of the inserts is fixed within a corresponding one of the holes.

18. The die according to claim 1, wherein a ratio of the first thermal conductivity and the second thermal conductivity is a multiple of the thickness of the base.

19. A system for forming a part, the system comprising:
a die, comprising:
a base, comprising a heat-platen interface surface and a part interface surface, and wherein the heat-platen interface surface and the part interface surface are separated by a thickness of the base; and
inserts, embedded within and circumferentially closed by the base, spaced apart from each other, and extending in a first direction from the heat-platen interface surface toward the part interface surface; and
wherein:
the base is made of a first material having a first thermal conductivity;
the inserts comprise first inserts made of a second material having a second thermal conductivity and second inserts made of a third material having a third thermal conductivity;
the first thermal conductivity is different than the second thermal conductivity; and
the third thermal conductivity is different than the first thermal conductivity and the second thermal conductivity;
a support surface, configured to support a material to be formed into the part by the die, wherein the die is movable toward and away from the support surface; and
a heat platen, thermally coupled with the heat-platen interface surface of the base and configured to supply heat to the base and the inserts.

20. The system according to claim 19, wherein the inserts extend from the heat-platen interface surface to the part interface surface such that the inserts span an entirety of the thickness of the base.

* * * * *